United States Patent
Shah (10) Patent No.: US 6,524,720 B1
(45) Date of Patent: Feb. 25, 2003

(54) MOISTURE BARRIER FILM

(75) Inventor: Gautam P. Shah, Simpsonville, SC (US)

(73) Assignee: Cryovac, Inc., Duncan, SC (US)

(*) Notice: Subject to any disclaimer, the term of this patent is extended or adjusted under 35 U.S.C. 154(b) by 0 days.

(21) Appl. No.: 08/787,895

(22) Filed: Jan. 23, 1997

Related U.S. Application Data (63) Continuation of application No. 08/433,279, filed on Apr. 28, 1995, now abandoned, which is a division of application No. 08/431,225, filed on Apr. 28, 1995, now Pat. No. 5,910,374, which is a division of application No. 08/430,632, filed on Apr. 28, 1995, now abandoned, which is a division of application No. 08/358,121, filed on Dec. 16, 1994, now Pat. No. 5,543,223, which is a division of application No. 08/116,798, filed on Sep. 10, 1993, now Pat. No. 5,482,771, which is a continuation-in-part of application No. 07/947,244, filed on Sep. 18, 1992, now abandoned.

(51) Int. Cl.$^7$ .............................................. B32B 27/32
(52) U.S. Cl. .................... 428/516; 428/520; 428/910
(58) Field of Search ................. 428/515, 516, 428/520, 34.9, 34.7, 36.6, 36.7, 35.4, 910

(56) References Cited

U.S. PATENT DOCUMENTS

| 4,230,767 A | 10/1980 | Isaka et al. ................. 428/349 |
| 4,343,852 A | 8/1982 | Isaka et al. ................. 428/216 |

(List continued on next page.)

FOREIGN PATENT DOCUMENTS

| EP | 118060 | 9/1984 |
| EP | 137454 | 4/1985 |
| EP | 180087 | 5/1986 |
| EP | 0321843 | 6/1989 |
| EP | 0415270 A2 | 3/1991 |
| EP | 492720 | 7/1992 |
| EP | 0492720 A1 | 7/1992 |
| JP | 4-275143 | 12/1991 |
| JP | 04077235 | 9/1992 |
| NZ | 177626 | 9/1977 |
| NZ | 190641 | 3/1981 |
| NZ | 214043 | 1/1989 |
| NZ | 229218 | 11/1990 |

OTHER PUBLICATIONS

Richard J. Lewis, Hawley's Condensed Chemical Dictionary, 12th ED., pp 612, 1993.*
Julius Grant, Hackh's Chemical Dictionary, 4th ED., pp 331, 1969.*
Hydrocarbon resins Hydrocarbon resins vol 7–758–779.
Escorez Tackifying Resins Polymers/Exxon Chem.
Whttington's Dictionary . . 164.
New Resins For Improving. Regalrez 1128/1139.
An Improved Moisture . . . SPO '91 423–445.
Arkon–A Film And Resin . . . Mitsui Plastics, Inc. 1–32.

*Primary Examiner*—D. Lawrence Tarazano
(74) *Attorney, Agent, or Firm*—Mark B. Quatt (57) ABSTRACT

A multiple layer film useful in moisture barrier packaging applications has at least one layer comprising a blend of propylene polymer or copolymer, and a hydrocarbon resin; and two additional layers comprising a propylene polymer or copolymer, ethylene alpha olefin copolymer, ionomer, polybutene, or blends thereof. A core layer of ethylene vinyl alcohol copolymer or other oxygen barrier material, or high density polyethylene, can be included in some embodiments. A preferred embodiment of the multi-layer film exhibits excellent moisture barrier and optical properties, and shrink properties as well if the film has been oriented. High oxygen barrier is also a feature in embodiments including EVOH or other oxygen barrier materials.

2 Claims, 2 Drawing Sheets

U.S. PATENT DOCUMENTS

| | | | |
|---|---|---|---|
| 4,390,385 A | 6/1983 | Ferguson et al. | 156/229 |
| 4,439,478 A | 3/1984 | Ferguson et al. | 428/137 |
| 4,734,318 A | 3/1988 | Crass et al. | 428/216 |
| 4,755,419 A | 7/1988 | Shah | 428/220 |
| 4,869,938 A | 9/1989 | Usami et al. | 428/34 |
| 4,891,253 A * | 1/1990 | Mueller | 428/35.2 |
| 4,921,749 A | 5/1990 | Bossaert et al. | 428/216 |
| 4,948,657 A | 8/1990 | Ogawa et al. | 428/218 |
| 5,026,592 A | 6/1991 | Janocha et al. | 428/204 |
| 5,043,204 A | 8/1991 | Itaba et al. | 428/213 |
| 5,075,156 A | 12/1991 | Tanaka et al. | 428/212 |
| 5,085,943 A | 2/1992 | Crighton et al. | 428/500 |
| 5,091,237 A | 2/1992 | Schloegl et al. | 428/515 |
| 5,116,926 A | 5/1992 | Packham et al. | 426/348 |
| 5,118,566 A | 6/1992 | Wilhelm et al. | 428/339 |
| 5,128,183 A | 7/1992 | Buzio | 428/35 |
| 5,132,074 A | 7/1992 | Isozaki et al. | 264/564 |
| 5,145,728 A | 9/1992 | Itaba et al. | 428/213 |
| 5,151,317 A | 9/1992 | Bothe | 428/216 |
| 5,152,946 A | 10/1992 | Gillette | 264/230 |
| 5,185,203 A | 2/1993 | Itaba et al. | 428/349 |
| 5,204,182 A | 4/1993 | Packham et al. | 428/349 |
| 5,212,009 A | 5/1993 | Peiffer et al. | 428/220 |
| 5,213,744 A | 5/1993 | Bossaert | 264/171 |
| 5,234,733 A | 8/1993 | Schloegl et al. | 428/36 |
| 5,292,563 A | 3/1994 | Peiffer et al. | 428/35 |
| 5,429,862 A * | 7/1995 | Schuhmann et al. | 428/215 |

* cited by examiner

MOISTURE BARRIER FILM

This application is a File Wrapper Continuation of application Ser. No. 08/433,279 filed Apr. 28, 1995, now abandoned, which is a Divisional application of application Ser. No. 08/431,225, filed on Apr. 28, 1995 now U.S. Pat No. 5,910,374, which is a Divisional application of application Ser. No. 08/430,632, filed Apr. 28, 1995 abandoned, which is a Divisional application of application Ser. No. 08/358,121, filed on Dec. 16, 1994, issued as U.S. Pat. No. 5,543,223 on Aug. 6, 1996, which is a Divisional application of application Ser. No. 08/116,798, filed Sep. 10, 1993, issued as U.S. Pat. No. 5,482,771 on Jan. 9, 1996, which is a Continuation-In-Part of application Ser. No. 07/947,244, filed Sep. 18, 1992, now abandoned.

FIELD OF THE INVENTION

This invention relates to thermoplastic films for packaging; and more particularly, this invention relates to a multi-layer film having high moisture barrier characteristics.

BACKGROUND OF THE INVENTION

Thermoplastic film, and in particular polyolefin materials, have been used for some time in connection with packaging of various articles including food products which require protection from the environment, an attractive appearance, and resistance to abuse during the storage and distribution cycle. Suitable optical properties are also desirable in order to provide for inspection of the packaged product after packaging, in the distribution chain, and ultimately at point of sale. Optical properties such as high gloss, high clarity, and low haze characteristics contribute to an aesthetically attractive packaging material and packaged product to enhance the consumer appeal of the product.

Various polymeric materials have been used to provide lower moisture permeability in order to reduce the transmission of moisture through the packaging film and thereby extend the shelf life of products such as food, medical, electronic, and other items which are sensitive to moisture gain or loss. For some products, maintenance of a high moisture content is desirable, and the film ideally minimizes loss of moisture from the package to the environment. For other products, maintenance of a low moisture content is desirable, and the film ideally minimizes gain of moisture from the environment through the packaging material.

It is also often desirable to include in a packaging film a shrink feature, i.e, the propensity of the film upon exposure to heat to shrink or, if restrained, create shrink tension within the packaging film. This property is imparted to the film by orientation of the film during its manufacture. Typically, the manufactured film is heated to its orientation temperature and stretched in either a longitudinal (machine) or transverse direction (i.e. monoaxial orientation), or both directions (i.e. biaxial orientation), in varying degrees to impart a certain degree of shrinkability in the film upon subsequent heating. When biaxial orientation is done, it can be simultaneous or sequential; that is, the orientation can be done in each of the directions in turn, or else both the longitudinal and transverse orientation can be done at the same time. Any suitable technique, such as blown bubble or tenterframing, can be used to achieve orientation of the film. After being so stretched, the film is rapidly cooled to provide this latent shrinkability to the resulting film. One advantage of shrinkable film is the tight, smooth appearance of the wrapped product that results, providing an aesthetic package as well as protecting the packaged product from environmental abuse. Various food and non-food items may be and have been packaged in shrinkable films.

It is sometimes also desirable to orient a packaging film and thereafter heat set the film by bringing the film to a temperature near its orientation temperature. This produces a film with substantially less shrinkability, while retaining much of the advantages of orientation, including improved tensile strength, modulus and optical properties.

It is an object of the present invention to provide a thermoplastic multilayer film characterized by good moisture barrier properties.

It is a further object of the present invention to provide a thermoplastic multilayer film having an aesthetic appearance with good clarity, and other desirable optical properties.

It is another object of the present invention to provide a thin thermoplastic multilayer film having toughness and abrasion resistance.

It is still another object of the present invention to provide a thermoplastic multilayer film which may be totally coextruded, oriented, and have good moisture barrier and, in some cases, both moisture barrier and oxygen barrier properties.

Of interest are U.S. Pat. Nos. 4,921,749 (Bessaert et al); 5,085,943 (Crighton et al); 5,091,237 (Schloegel et al); 5,128,183 (Buzio); and 5,212,009 (Peiffer et al) disclosing the use of hydrocarbon resins.

SUMMARY OF THE INVENTION

The present invention relates to a thermoplastic multi-layer film comprising a core layer comprising a blend of propylene polymer or copolymer, or ethylene alpha olefin copolymer, and a hydrocarbon resin; and two outer layers comprising a propylene polymer or copolymer, ethylene alpha olefin copolymer, polybutene, or blends thereof.

In another aspect, the present invention relates to a thermoplastic multi-layer film comprising a core layer comprising a blend of propylene polymer or copolymer, and a hydrocarbon resin; two intermediate layers, on opposite surfaces of the core layer, comprising propylene polymer or copolymer, or a polymeric adhesive; and two outer layers comprising a propylene polymer or copolymer, ethylene alpha olefin copolymer, ionomer, polybutene, or blends thereof.

The present invention also relates to a thermoplastic multi-layer film comprising a core layer comprising an ethylene alpha olefin copolymer, ethylene propylene copolymer, rubber modified ethylene propylene copolymer, or ethyene propylene butene terpolymer; two intermediate layers, on opposite surfaces of the core layer, comprising a blend of propylene polymer or copolymer, and a hydrocarbon resin; and two outer layers comprising a propylene polymer or copolymer, ethylene alpha olefin copolymer, ionomer, polybutene, or blends thereof.

A film with oxygen barrier as well as moisture barrier properties comprises a core layer comprising an oxygen barrier material; two intermediate layers, on opposite surfaces of the core layer, comprising a polymeric adhesive; two outer layers comprising a blend of propylene polymer or copolymer, or polybutene, and a hydrocarbon resin; and a polymeric sealant layer adhered to at least one of the outer layers.

An alternative film with at least seven layers comprises a core layer comprising high density polyethylene; two intermediate layers, on opposite surfaces of the core layer, comprising a polymeric adhesive, ethylene vinyl acetate copolymer, or ethylene alpha olefin copolymer; two moisture barrier layers comprising a blend of propylene polymer or copolymer, and a hydrocarbon resin; and two outer layers comprising propylene polymer or copolymer, polybutene, or blends thereof.

Another alternative is a film comprising a core layer comprising an oxygen barrier material; two intermediate layers, on opposite surfaces of the core layer, comprising polyamide; two tie layers, each disposed on a respective polyamide layer, comprising a polymeric adhesive, ethylene alpha olefin copolymer, or ethylene vinyl acetate copolymer; two moisture barrier layers, adhered to respective adhesive layers, comprising a blend of propylene polymer or copolymer, and a hydrocarbon resin; and two outermost layers comprising a propylene polymer, propylene copolymer, ethylene alpha olefin copolymer, or polybutene.

In another aspect of the invention, a method of making a thermoplastic multilayer film comprises the steps of coextruding an interior layer of a blend of propylene polymer or copolymer, and a hydrocarbon resin, and two outer layers comprising a propylene polymer or copolymer, ethylene alpha olefin copolymer, polybutene, or blends thereof; cooling the coextruded multilayer film; and collapsing the cooled film.

DEFINITIONS

"Hydrocarbon resin" ("HC" herein) and the like as used herein means resins made by the polymerization of monomers composed of carbon and hydrogen only. Thermoplastic resins of low molecular weight made from relatively impure monomers derived from coal-tar fractions, petroleum distillates, etc. are also included. A discussion of HC resins can be found e.g. in U.S. Pat. Nos. 4,921,749 (Bossaert et al); 5,091,237 (Schloegel et al); and 5,128,183 (Buzio).

"Ethylene alpha olefin copolymer" (EAO) is used here to include such materials as linear low density polyethylene (LLDPE); very low and ultra low density polyethylene (VLDPE and ULDPE); and metallocene catalyzed polymers such as those supplied by Exxon. Tafmer (tm) materials supplied by Mitsui are also included. These materials generally include copolymers of ethylene with one or more comonomers selected from $C_4$ to $C_{20}$ alphaolefins such as butene-1, hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. "LLDPE" as defined here has a density in the range of from about 0.916 grams per cubic centimeter to about 0.940 grams per cubic centimeter. Generally, "EAO" as used here includes both homogeneous and heterogeneous polymers.

"Intermediate layer" and the like is used herein to define a layer in a multi-layer film enclosed on both sides by other layers, i.e. disposed between other layers of the film.

The term "oriented" and the like is used herein to define a polymeric material in which the molecules have been aligned in the longitudinal and/or transverse direction by a process such as a tenter frame or blown bubble process.

"Propylene polymer" and the like is used here to mean polymerized propylene in its homopolymer form, and "propylene copolymers" means copolymers such as ethyene propylene copolymer, where generally small amounts of a comonomer such as ethylene are included in the copolymer. Terpolymers are also included.

"Polymeric adhesive" and the like here means polymeric materials, of any suitable composition, which can be used to create or enhance interlaminar bonds in multilayer thermoplastic films. Polyolefins are preferred, especially those which have been modified, e.g. by carboxylic acid or acid anhydride in a graft copolymer.

"Rubber modified EPC" and the like here means an EPC which has been modified by the inclusion of other moieties in the polymer structure. Such material may provide improved elasticity or other properties. An example is believed to be Himont KS-052 P, or those available from Rexene (El Paso).

"Ethylene propylene butene terpolymer" and the like is used here to mean a terpolymer incorporating these three comonomers in various percentages. An example is KT-021 from Himont, or those available from Sumitomo.

"Core layer" as used herein means an intermediate layer of a multilayer film, and the central layer where the film has an odd number of layers.

BRIEF DESCRIPTION OF THE DRAWINGS

Further details are given below with reference to the drawing figures wherein.

DESCRIPTION OF THE PREFERRED EMBODIMENTS

Figure 1:
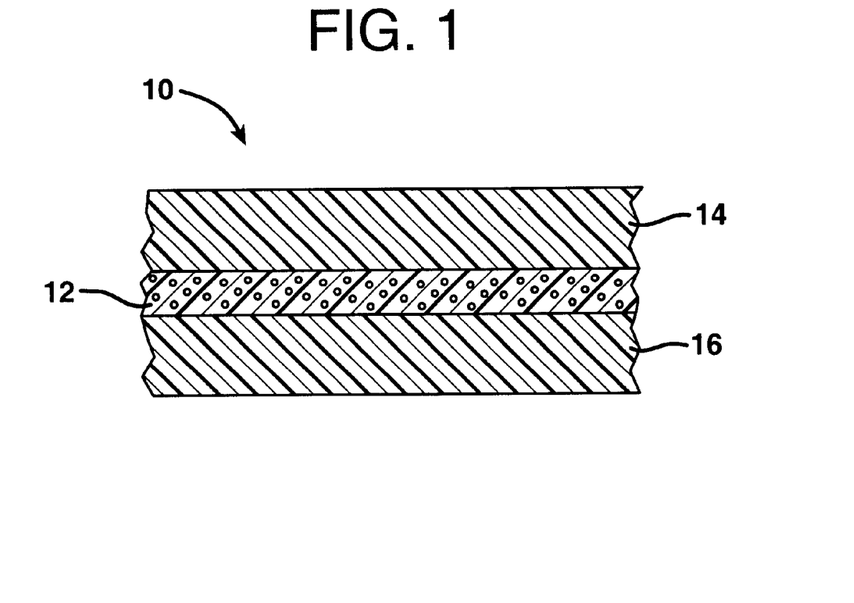
FIG. 1 is a schematic cross section of a preferred embodiment of a multi-layer moisture barrier film of the invention.

Referring specifically to the drawings, in FIG. 1, a schematic cross section of a preferred embodiment of the multi-layer moisture barrier film of the invention is shown. The multi-layer film 10 has the generalized structure of A/B/A where A is an outer layer, and B is a core layer comprising a moisture barrier material.

Core layer 12 preferably comprises a blend of a propylene polymer or copolymer, and a hydrocarbon resin, this blend shown as a spotted/striped layer. A typical example of a propylene homopolymer is Exxon PD 4062 E7, or those available from Fina, or Himont PD 064. A preferred propylene copolymer is ethylene propylene copolymer sold under the designation Fina 8473 or Fina 8473X. This material has an ethylene content of about 4%. A preferred hydrocarbon resin is Regalrez 1128 or 1139 from Hercules. The HC resin preferably comprises between about 30% and 50% by weight of the blend.

Outer layers 14 and 16 are preferably ethylene propylene copolymer (EPC), polypropylene (PP), or blends thereof. If only polypropylene resin is used, the film can be difficult to use for packaging applications involving heat sealing. Therefore, it is preferable to use EPC alone, or the blend of the two materials. Commercial resin examples are those discussed above for core layer 12. An alternative polypropylene for the outer layers 14 and 16 is Himont PDO 64. These blend layers may include from 0–100% EPC and 100%–0% PP, although preferably the blend layers include between about 96% and 85% EPC and between about 4% and 15% PP; even more preferably, the blend layer includes about 92% EPC and 8% PP. EAO and polybutene can also be used in the outer layers.

Figure 2:
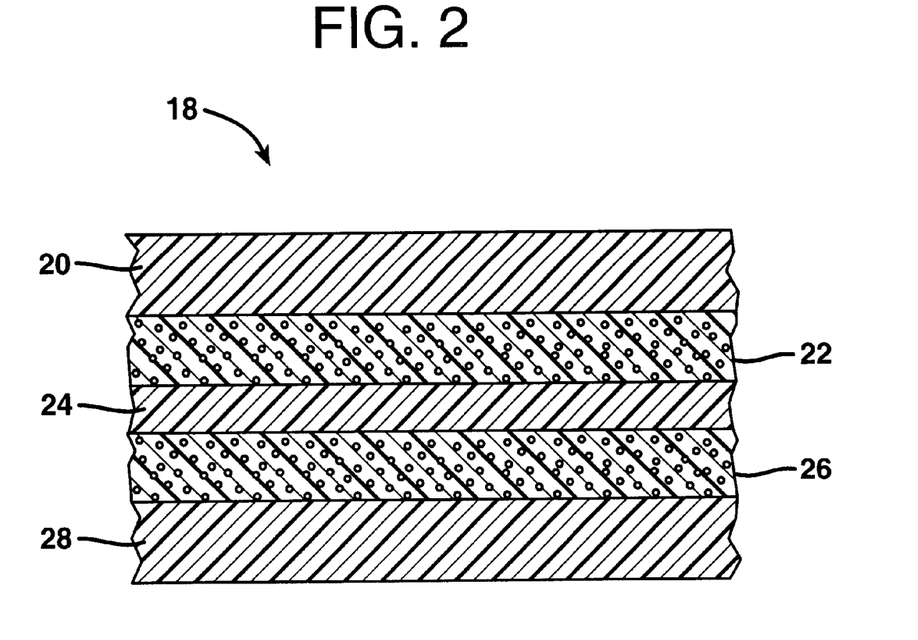
FIGS. 2 and 3 are alternative embodiments of the invention.

In FIG. 2, a schematic cross section of another embodiment of the multi-layer moisture barrier film of the invention is generally shown. The multi-layer film has the structure of A/B/C/B/A where A is an outer layer, B is an intermediate adhesive layer, and C is a core layer comprising a moisture barrier material.

The core layer preferably comprises a blend of a propylene polymer or copolymer, and a hydrocarbon resin. Suitable materials are those described above for core layer 12 of film 10.

The outer layers are preferably the materials discussed above for outer layers 14 and 16 of film 10. The outer layers also preferably include an HC such as described for core layer 12 of film 10.

The intermediate layers preferably comprise a propylene polymer or copolymer,or blends thereof, optionally blended with hydrocarbon resin.

An alternative A/B/C/B/A structure is also within the scope of this invention, and specifically shown by the position of the moisture barrier layers in the film of FIG. 2.

In this alternative, core layer 24 preferably comprises an ethylene alpha olefin copolymer, more preferably a linear EAO. Very low density polyethylene (VLDPE), and linear low density polyethyene (LLDPE) are preferred. A suitable LLDPE is Dowlex 2045. The core layer 24 can also comprise EPC, a rubber modified EPC, or an ethylene terpolymer, especially an ethylene propylene butene terpolymer such as KT 021 P from Himont.

Outer layers 20 and 28 are preferably the materials discussed above for outer layers 14 and 16 of film 10.

Intermediate layers 22 and 26 preferably comprise a blend of a propylene polymer or copolymer, and a hydrocarbon resin. Suitable materials are those described above for core layer 12 of film 10. An alternative material for layers 22 and 26 is Exxon 6042, which is believed to be a blend of polypropylene and hydrocarbon resin.

Figure 3:
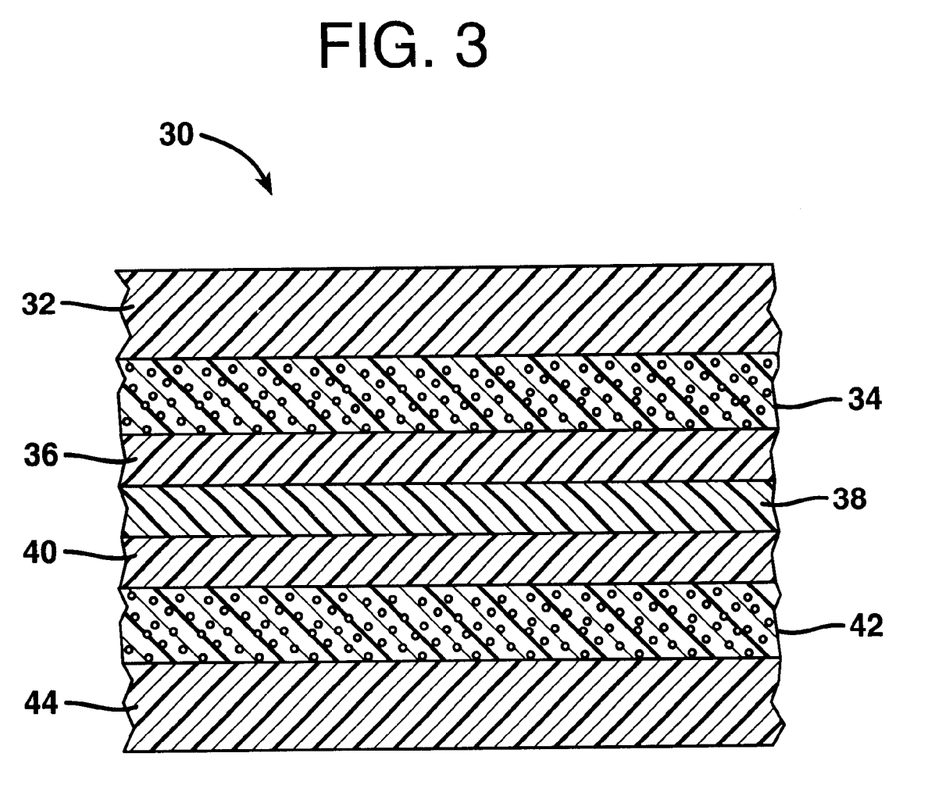

In FIG. 3, a schematic cross section of another embodiment of the multi-layer moisture barrier film of the invention is shown. The multi-layer film 30 has the generalized structure of A/B/C/D/C/B/A where A is an outer layer, B is a moisture barrier layer, C is an intermediate adhesive layer, and D is a core layer comprising an oxygen barrier material.

Core layer 38 preferably comprises an oxygen barrier material such as ethylene vinyl alcohol copolymer, vinylidene chloride copolymer, polyester, or polyamide.

Outer layers 32 and 44 are preferably the materials discussed above for outer layers 14 and 16 of film 10.

Intermediate layers 36 and 40 preferably comprise a propylene polymer or copolymer, such as Exxon PD 4062 E7. Alternative materials are polymeric adhesives, especially carboxylic acid or maleic anhydride-modified polyolefins and more preferably polypropylene-based carboxylic acid or maleic anhydride-modified adhesives. Conventional lamination or other suitable methods may sometimes be necessary, depending on the nature of the respective layers, to ensure adequate interlaminar bond strength.

Moisture barrier layers 34 and 42 preferably comprise a blend of a propylene polymer or copolymer, and a hydrocarbon resin. Suitable materials are those described above for core layer 12 of film 10. An alternative material for layers 34 and 42 is Exxon 6042.

An alternative film with at least seven layers comprises a core layer 38 comprising high density polyethylene; two intermediate layers 36 and 40, on opposite respective surfaces of the core layer, comprising a polymeric adhesive, ethylene vinyl acetate copolymer, or ethylene alpha olefin copolymer; two moisture barrier layers 34 and 42 comprising a blend of propylene polymer or copolymer and a hydrocarbon resin; and two outermost layers 32 and 44 comprising propylene polymer or copolymer.

A multilayer film of four or six layers, and/or possessing both moisture barrier and oxygen barrier properties, can also be made in accordance with the present invention. In such alternative constructions, a blend of HC resin with propylene polymer or copolymer can be present in any of the layers of the multilayer film.

The core, intermediate, and moisture barrier layers of such a film can be like that of film 30. A sealant layer is coextruded with, or extrusion coated, extrusion laminated, or adhesive laminated, by means and methods well known in the art, to one of the moisture barrier layers. The sealant layer, which can be disposed on one or both outer surfaces of the film structure, preferably comprises an ethylene alpha olefin copolymer, more preferably a linear EAO. Very low density polyethylene (VLDPE), and linear low density polyethyene (LLDPE) are preferred. A suitable LLDPE is Dowlex 2045. The sealant layer can also comprise EPC, a rubber modified EPC, an ethylene propylene butene terpolymer such as KT 021 P from Himont, an ethylene vinyl acetate copolymer, an ethylene alkyl acrylate copolymer, an ethylene acrylic or methacrylic acid copolymer, or an ionomer.

The films of the present invention can be made by coextrusion, extrusion coating, extrusion laminating, and conventional adhesive lamination techniques well known in the art, using annular or slot die extrusion equipment as appropriate.

The beneficial low moisture transmission rates (high moisture barrier) and other properties associated with exemplary films of the present invention are demonstrated in the Tables.

The resins used in these examples are identified in Table 1, and the films made from these resins are identified in Tables 2 through 8.

Physical properties of these films are itemized in the remaining Tables. Values given are typically average values obtained from four replicate measurements; values for MVTR are average obtained from three samples.

The terms and abbreviations In the Tables have the following meaning:

"PP"=polypropylene.

"EPC"=ethylene propylene copolymer.

"EAO"=ethylene alpha olefin copolymer.

"EPB"=ethylene propylene butene terpolymer.

"EVOH"=ethylene vinyl alcohol copolymer.

"ADH"=polymeric adhesive; ADH 1 is an ethylene butene—based adhesive from Du Pont; ADH 2 is an EPC-based adhesive from Mitsui.

"AB"=antiblock.

"MO"=mineral oil.

"Tensile"=tensile at break and 73° F., in PSI (ASTM D 882-81).

"PSI"=pounds per square inch (ASTM 882-81).

"Unshrunk"=a film sample or samples that were not shrunk by exposure to heat at the time of testing for the stated property.

"Shrunk"=a film sample or samples that were shrunk by exposure to heat at the time of testing for the stated property.

"LD"=longitudinal orientation direction.

"TD"=transverse orientation direction.

"Modulus"=modulus of elasticity (ASTM 882-81) in PSI at 73° F.

"Haze"=haze (ASTM D 1003-61 (reapproved 1977)) in per cent.

"Clarity"=total light transmission (ASTM D 1003 Method A) in percent.

"Gloss"=gloss measured at 45° angle to film surface (ASTM D 2457-70 (reapproved 1977)).

"MVTR 1"=moisture (water) vapor transmission rate (ASTM F 372) in grams/24 hours, 100 square inches at 100% relative humidity and 100° F.

"MVTR 2"=moisture (water) vapor transmission rate (ASTM F 372) in grams/24 hours, 100 square inches at 90% relative humidity and 100° F.

"OTR"=oxygen transmission rate (ASTM D 3985-81) in cc at standard temperature and pressure, in 24 hours, per square meter, at one atmosphere, at 0% relative humidity.

"Tear" =tear propagation in grams at 73° F. (ASTM D 1938-79).

"Film Thickness"=the average thickness (gauge) of the film samples in mils (=0.001 inches).

"Tensile"=tensile strength at break (ASTM D 882-81) in psi.

"Elongation"=elongation at break (ASTM D 882-81) in percent.

"Ball Burst"=ball burst impact in centimeters-kilograms at 73° F. (ASTM D 3420-80).

| MATERIAL | TRADENAME | SUPPLIER |
| --- | --- | --- |
| PP 1 | Profax PD-064 | Himont |
| PP 2* | [see footnote] | |
| PP 3 | PD 4062 | Exxon |
| PP 4** | Escorene PD 6042 | Exxon |
| | [see footnote] | |
| EPC 1 | Fina 8473 or | Fina |
| | Fina 8473 X | |
| EPC 2*** | [see footnote] | |
| EPC 3 | PD 9302 | Exxon |
| EPB 1 | KT-021 | Himont |
| HC 1 | Regalrez 1128 | Hercules |
| HC 2 | Escorez 5340 | Exxon |
| HC 3 | Regalrez 1139 | Hercules |
| EAO 1 | Dowlex 2045.03 | Dow |
| EAO 2 | Dowlex 2045.04 | Dow |
| ADH 1 | Bynel CXA 4104 | Du Pont |
| ADH 2 | Admer QF 551 A | Mitsui |
| EVOH 1 | EVAL SC H-103 | Evalca |
| EVOH 2 | EVAL LC F-101 A | Evalca |
| EVOH 3 | EVAL LC H-103 | Evalca |
| MO 1 | Kaydol | Witco |

*PP 2 is a masterbatch blend of PP 1 with about 4%, by weight of the blend, of a silica-containing anti-blocking agent, about 5% by weight of amide waxes, and about 1% of a lubricating agent. The amide waxes and lubricating agent are well known in the art as slip agents.
**PP 4 is Escorene PD 6042, believed to be a blend of polypropylene and hydrocarbon resin.
***EPC 2 is a blend of EPC 1 blended with about 1.5%, by weight of the blend, of an antiblock agent, and 0.5%, by weight of the blend, of a mineral oil.

TABLE 2

(CONTROL)
Initial efforts to make a moisture barrier material involved the use of homopolymer polypropylene in a core layer, with sealant layers of propylene copolymer on both surfaces of the core layer. The object was to maximize thickness of the core layer to minimize the moisture vapor transmission rate (MVTR), while still maintaining adequate free shrink and sealability properties of the film. The MVTR did not prove adequate for at least some moisture barrier packaging applications. An example of this film is given below:

| EXAMPLE | FILM STRUCTURE |
| --- | --- |
| 1. | 92% EPC 1 + 8% PP 2/PP 1/92% EPC 1 + 8% PP 2 |
| | The generalized structure of the film of Example 3 was A/B/A. |
| | Relative layer thickness ratios: |
| | A = 1.0; B = 2.0; A = 1.0. |

TABLE 3

The films of Table 3 were made in an effort to make a moisture barrier material with lower MVTR. This was achieved using hydrocarbon resin blended with homopolymer polypropylene. It was found that these formulations had much lower moisture vapor transmission rate (MVTR) than those of Table 2. However, they could not be oriented much over 4.5 × 4.5 racking (orientation) ratio because of equipment limitations. On other equipment, e.g. a modified bubble process or tenterframing, higher orientation (racking) rates can be achieved. They also could not be made into heavier gauge films because of relatively poor tear properties. Examples of these films are given below:

| EXAMPLE | FILM STRUCTURE |
| --- | --- |
| 2. | 90%[92% EPC 1 + 8% PP 2] + 10% HC 1 |
| | PP 3 |
| | 84.5% PP 3 + 15% HC 1 + 0.5% MO 1 |
| | PP 3 |
| | 90%[92% EPC 1 + 8% PP 2] + 10% HC 1 |
| | The generalized structure of the film of Example 2 was A/B/C/B/A. |
| | Relative layer thickness ratios: |
| | 2.5:0.8:3.7:0.6:2.4. |
| 3. | 92% EPC 1 + 8% PP 2/PP 4/92% EPC 1 + 8% PP 2 |
| | The generalized structure of the film of Example 3 was A/B/A. |
| | Relative layer thickness ratios: |
| | 1:2:1 |
| 4. | 92% EPC 1 + 8% PP 2/PP 4/92% EPC 1 + 8% PP 2 |
| | The generalized structure of the film of Example 4 was A/B/A. |
| | Relative layer thickness ratios: |
| | 1:3:1. |

TABLE 4

Alternative films of Table 4 were made in which, in effect, the core layer of the films of Table 3 (i.e. the layer containing the hydrocarbon resin) were "split" into two substrate (intermediate) layers. A "new" core layer of e.g. LLDPE or EPC is introduced. The practical effect of this is to improve tear properties of the film, related to tape creasing during the orientation process, so that it can be oriented at e.g. 6 × 6 ratio. The film was in fact oriented at 4 × 4.5 because of the equipment limitations discussed for the Examples of Table 3. Examples of these films are given below:

| EXAMPLE | FILM STRUCTURE |
| --- | --- |
| 5. | 92% EPC 1 + 8% PP 2/PP 4/EAO 1/PP 4/92% EPC 1 + 8% PP 2 |
| | The generalized structure of the film of Example 5 was A/B/C/B/A. |
| | Relative layer thickness ratios: |
| | 1.5:3:1:3:1.5. |

TABLE 4-continued

Alternative films of Table 4 were made in which, in effect, the core layer of the films of Table 3 (i.e. the layer containing the hydrocarbon resin) were "split" into two substrate (intermediate) layers. A "new" core layer of e.g. LLDPE or EPC is introduced. The practical effect of this is to improve tear properties of the film, related to tape creasing during the orientation process, so that it can be oriented at e.g. 6 × 6 ratio. The film was in fact oriented at 4 × 4.5 because of the equipment limitations discussed for the Examples of Table 3. Examples of these films are given below:

| EXAMPLE | FILM STRUCTURE |
|---|---|
| 6. | 92% EPC 1 + 8% PP 2/PP 4/EPC 1/PP 4/92% EPC 1 + 8% PP 2<br>The generalized structure of the film of Example 6 was A/B/C/B/A.<br>Relative layer thickness ratios:<br>1.5:3:1:3:1.5 |

TABLE 5

The inventor took the basic constructions of Table 4, and oriented them at generally higher racking ratios of 6 × 6. The result was a film showing improvements in (i.e. lower) MVTR. Examples of these films are given below:

| EXAMPLE | FILM STRUCTURE |
|---|---|
| 7. | 92% EPC 1 + 8% PP 2/PP 4/EAO 1/PP 4/92% EPC 1 + 8% PP 2<br>The generalized structure of the film of Example 7 was A/B/C/B/A. This film was like that of Example 5, but with both MD and TD racking ratios of about 6 × 6 in the longitudinal and transverse directions respectively.<br>Relative layer thickness ratios:<br>1.5:3:1:3:1.5. |
| 8. | 92% EPC 1 + 8% PP 2/PP 4/EAO 1/PP 4/92% EPC 1 + 8% PP 2<br>The generalized structure of the film of Example 8 was A/B/C/B/A. This film was like that of Example 7, but oriented at a higher temperature compared to Example 7.<br>Relative layer thickness ratios:<br>1.5:3:1:3:1.5 |
| 9. | 92% EPC 1 + 8% PP 2/PP 4/EAO 2/PP 4/92% EPC 1 + 8% PP 2<br>The generalized structure of the film of Example 9 was A/B/C/B/A.<br>Relative layer thickness ratios:<br>1.5:3:1:3:1.5. |
| 10. | 92% EPC 1 + 8% PP 2/PP 4/EPB 1/PP 4/92% EPC 1 + 8% PP 2<br>The generalized structure of the film of Example 10 was A/B/C/B/A.<br>Relative layer thickness ratios:<br>1.5:3:1:3:1.5. |
| 11. | 92% EPC 1 + 8% PP 2<br>70% PP 3 + 30% HC 2<br>EAO 2<br>70% PP 3 + 30% HC 2<br>92% EPC 1 + 8% PP 2<br>The generalized structure of the film of Example 11 was A/B/C/B/A.<br>Relative layer thickness ratios:<br>1.5:3:1:3:1.5. |
| 12. | 90% EPC 1 + 10% PP 2/PP 4/EPC 1/PP 4/90% EPC 1 + 10% PP 2<br>The generalized structure of the film of Example 12 was A/B/C/B/A.<br>Relative layer thickness ratios:<br>1.5:3:1:3:1.5. |
| 13. | 90% EPC 1 + 10% PP 2/PP 4/EPC 1/PP 4/90% EPC 1 + 10% PP 2<br>The generalized structure of the film of Example 13 was A/B/C/B/A. This film was like that of Example 12, but lower racking ratios of 4.5 × 4.5 to produce a film of 132 gauge |

TABLE 5-continued

The inventor took the basic constructions of Table 4, and oriented them at generally higher racking ratios of 6 × 6. The result was a film showing improvements in (i.e. lower) MVTR. Examples of these films are given below:

| EXAMPLE | FILM STRUCTURE |
|---|---|
| | thickness.<br>Relative layer thickness ratios:<br>1.5:3:1:3:1.5. |
| 14. | 90% EPC 1 + 10% PP 2/PP 4/EPC 1/PP 4/90% EPC 1 + 10% PP 2<br>The generalized structure of the film of Example 14 was A/B/C/B/A. This film was like that of Example 13, but with slightly higher racking ratios (4.5 × 5.0) and a final film thickness of 155 gauge.<br>Relative layer thickness ratios:<br>1.5:3:1:3:1.5. |
| 15. | 87.5% EPC 3 + 12.5% PP 2<br>PP 4<br>EPC 3<br>PP 4<br>87.5% EPC 3 + 12.5% PP 2<br>The generalized structure of the film of Example 15 was A/B/C/B/A.<br>Relative layer thickness ratios:<br>1.5:3:1:3:1.5. |
| 16. | 84% EPC 3 + 16% PP 2<br>PP 4<br>EPC 3<br>PP 4<br>84% EPC 3 + 16% PP 2<br>The generalized structure of the film of Example 16 was A/B/C/B/A.<br>Relative layer thickness ratios:<br>1.5:3:1:3:1.5. |
| 17. | 86% EPC 3 + 14% PP 2<br>PP 4<br>EPC 3<br>PP 4<br>86% EPC 3 + 14% PP 2<br>The generalized structure of the film of Example 17 was A/B/C/B/A.<br>Relative layer thickness ratios:<br>1.5:3:1:3:1.5. |

TABLE 6

The inventor made a seven layer film (Example 18) as a control, and then made two moisture/oxygen barrier seven-layer films (Examples 19 and 20) with good results. Examples of these films are given below:

| EXAMPLE | FILM STRUCTURE |
|---|---|
| 18. | 92% EPC 1 + 8% PP 2<br>PP 3<br>ADH 2<br>EVOH 1<br>ADH 2<br>PP 3<br>92% EPC 1 + 8% PP 2<br>The generalized structure of the film of Example 18 was A/B/C/D/C/B/A.<br>Relative layer thickness ratios:<br>1:2.5:1:1:1:2.5:1 |
| 19. | 92% EPC 1 + 8% PP 2<br>PP 4<br>ADH 1<br>EVOH 2<br>ADH 1<br>PP 4 |

TABLE 6-continued

The inventor made a seven layer film (Example 18) as a control, and then made two moisture/oxygen barrier seven-layer films (Examples 19 and 20) with good results. Examples of these films are given below:

| EXAMPLE | FILM STRUCTURE |
|---|---|
|  | 92% EPC 1 + 8% PP 2 |
|  | The generalized structure of the film of Example 19 was A/B/C/D/C/B/A. |
|  | Relative layer thickness ratios: |
|  | 1.5:2:1:1:1:2:1.5 |
| 20. | 92% EPC 1 + 8% PP 2 |
|  | PP 4 |
|  | ADH 2 |
|  | EVOH 3 |
|  | ADH 2 |
|  | PP 4 |
|  | 92% EPC 1 + 8% PP 2 |
|  | The generalized structure of the film of Example 20 was A/B/C/D/C/B/A. |
|  | Relative layer thickness ratios: |
|  | 1.5:2:1:1:1:2:1.5. |

TABLE 7

Two alternative films of seven layers have the structure:

| | |
|---|---|
| 21. | 92% EPC 1 + 8% PP 2 |
|  | PP 4 |
|  | EVA 1 |
|  | HDPE 1 |
|  | EVA 1 |
|  | PP 4 |
|  | 92% EPC 1 + 8% PP 2 |
|  | The generalized structure of the film of Example 21 is A/B/C/D/C/B/A. |
|  | Relative layer thickness ratios: |
|  | 1:2.5:1:1:1:2.5:1 |
| 22. | 92% EPC 1 + 8% PP 2 |
|  | PP 4 |
|  | VLDPE 1 |
|  | HDPE 1 |
|  | VLDPE 1 |
|  | PP 4 |
|  | 92% EPC 1 + 8% PP 2 |
|  | The generalized structure of the film of Example 22 is A/B/C/D/C/B/A. |
|  | Relative layer thickness ratios: |
|  | 1:2.5:1:1:1:2.5:1 |

TABLE 8

Two additional alternative films of five layers were made, and are compared in Table 13 with the film of Example 17. These two additional films have the following structures:

| | |
|---|---|
| 23. | 86% EPC 3 + 14% PP 2 |
|  | PP 4 |
|  | 85% EPC 3 + 15% HC 3 |
|  | PP 4 |
|  | 86% EPC 3 + 14% PP 2 |
|  | The generalized structure of the film of Example 23 is A/B/C/B/A. |
|  | Relative layer thickness ratios: |
|  | 1.5:3:1:3:1.5 |
| 24. | 86% [85% EPC 3 + 15% HC 3] + 14% PP 2 |
|  | PP 4 |
|  | 85% EPC 3 + 15% HC 3 |
|  | PP 4 |
|  | 85% EPC 3 + 15% HC 3 |
|  | The generalized structure of the film of Example 24 is A/B/C/B/C. |
|  | Relative layer thickness ratios: |
|  | 1.5:3:1:3:1.5 |

TABLE 9

| | Example 1 (control) | Example 2 | Example 3 | Example 4 |
|---|---|---|---|---|
| Modulus | | | | |
| LD | 239,480 | 279,920 | 316,030 | 336,820 |
| TD | 214,690 | 260,240 | 298,930 | 316,820 |
| Free Shrink/Shrink Tension | | | | |
| at 200° F.: | | | | |
| LD | 7/396 | 9/321 | 10/315 | 11/408 |
| TD | 12/388 | 14/381 | 17/528 | 17/504 |
| at 220° F.: | | | | |
| LD | 12/435 | 14/335 | 14/361 | 15/439 |
| TD | 18/432 | 19/383 | 24/540 | 25/548 |
| at 240° F.: | | | | |
| LD | 18/451 | 20/364 | 20/443 | 22/494 |
| TD | 26/469 | 28/413 | 33/591 | 33/516 |
| at 260° F.: | | | | |
| LD | 31/473 | 31/397 | 33/429 | 33/511 |
| TD | 35/493 | 39/441 | 45/538 | 44/561 |
| Haze | | | | |
| Unshrunk | 1.2 | 1.7 | 1.3 | 1.3 |
| Shrunk | 1.6 | 2.3 | 3.2 | 2.1 |
| Clarity | | | | |
| Unshrunk | 81 | 87 | 87 | 88 |
| Shrunk | 80 | 84 | 83 | 87 |
| Gloss | 87 | 84 | 87 | 88 |
| Film Thickness (mils) (related to MVTR data given below) | | | | |
| Unshrunk Actual MVTR 1 | 0.96 | 0.80 | 0.77 | 0.75 |
| Unshrunk Corrected for 75 gauge MVTR 2 | 0.60 0.77 | 0.67 0.71 | 0.60 0.62 | 0.55 0.55 |
| Unshrunk Corrected for 75 gauge | 0.49 0.63 | 0.55 0.59 | 0.48 0.49 | 0.45 0.45 |

TABLE 10

| | Example 7 | Example 8 | Example 9 | Example 10 |
|---|---|---|---|---|
| Modulus | | | | |
| LD | 271,200 | 299,200 | — | — |
| TD | 292,100 | 337,900 | — | — |
| Free Shrink | | | | |

TABLE 10-continued

|  | Example 7 | Example 8 | Example 9 | Example 10 |
|---|---|---|---|---|
| at 220° F.: | | | | |
| LD | — | — | 13 | 13 |
| TD | — | — | 19 | 20 |
| at 240° F.: | | | | |
| LD | 20 | 17 | 20 | 18 |
| TD | 28 | 23 | 30 | 27 |
| at 260° F.: | | | | |
| LD | — | — | 27 | 28 |
| TD | — | — | 37 | 38 |
| Haze | | | | |
| Unshrunk Clarity | — | — | 1.7 | 1.8 |
| Unshrunk Gloss | — | — | 82 | 84 |
|  | — | — | 84 | 55 |
| Film Thickness (mils) (related to MVTR data given below) | | | | |
| Unshrunk | 0.86 | 0.76 | 0.86 | 0.77 |
| Shrunk | 1.00 | 0.97 | — | — |
| MVTR 1 | | | | |
| Unshrunk | 0.51 | 0.56 | — | — |
| Shrunk Corrected for 75 gauge | 0.41 | 0.46 | — | — |
| Unshrunk | 0.58 | 0.57 | — | — |
| Shrunk | 0.55 | 0.59 | — | — |
| MVTR 2 | | | | |
| Unshrunk | 0.45 | 0.47 | 0.42 | 0.43 |
| Shrunk Corrected for 75 gauge | 0.35 | 0.38 | — | — |
| Unshrunk | 0.52 | 0.48 | 0.48 | 0.44 |
| Shrunk | 0.47 | 0.49 | — | — |
| Tear (grams) | | | | |
| LD | — | — | 8.6 | 5.0 |
| TD | — | — | 8.4 | 6.1 |

TABLE 11

|  | Example 11 | Example 12 | Example 13 | Example 14 |
|---|---|---|---|---|
| Modulus | | | | |
| LD | 345,750 | 352,880 | 322,950 | 320,470 |
| TD | 374,990 | 392,020 | 334,660 | 319,420 |
| Free Shrink at 240° F.: | | | | |
| LD | 20 | 17 | 18 | 14 |
| TD | 29 | 23 | 24 | 25 |
| Haze | | | | |
| Unshrunk Clarity | 48.5 | 1.3 | 3.3 | 5.3 |
| Unshrunk Gloss | 21 | 85 | 74 | 64 |
|  | 107 | 89 | 73 | 64 |
| Film Thickness (mils) (related to MVTR data given below) | | | | |
| Unshrunk MVTR 2 | 0.85 | 0.81 | 1.40 | 1.60 |
| Unshrunk | 0.36 | 0.36 | 0.23 | 0.19 |
| Corrected for 75 Gauge | 0.41 | 0.39 | 0.43 | 0.41 |
| Tear (grams) | | | | |
| LD | — | — | 8.6 | 5.0 |
| TD | — | — | 8.4 | 6.1 |

TABLE 12

|  | Example 19 | Example 20 |
|---|---|---|
| Modulus | | |
| LD | 300,890 | 307,380 |
| TD | 315,460 | 291,480 |
| Free Shrink/Shrink Tension at 220° F.: | | |
| LD | 8/440 | 14/395 |
| TD | 19/632 | 20/595 |
| at 240° F.: | | |
| LD | 18/477 | 21/429 |
| TD | 28/654 | 27/611 |
| at 260° F.: | | |
| LD | 28/446 | 29/436 |
| TD | 38/621 | 35/601 |
| at 280° F.: | | |
| LD | 44/467 | 43/487 |
| TD | 52/600 | 46/587 |
| at 300° F.: | | |
| LD | 59/— | 60/— |
| TD | 62/— | 61/— |
| Haze | | |
| Unshrunk Clarity | 1.6 | 1.8 |
| Unshrunk Gloss | 76 | 76 |
|  | 89 | 86 |
| Film Thickness (mils) (related to MVTR data given below) | | |
| Unshrunk MVTR 2 | 1.09 | 1.12 |
| Non-shrunk | 0.35 | 0.33 |
| Corrected for 75 gauge | 0.51 | 0.49 |
| Tear | | |
| LD | 6 | 6 |
| TD | 6 | 7 |
| Tensile | | |
| LD | 19,415 | 20,407 |
| TD | 19,296 | 16,990 |
| Elongation | | |
| LD | 63 | 62 |
| TD | 71 | 77 |
| Ball Burst | 12 | 11 |
| OTR | 3.0 | 4.5 |

TABLE 13

|  | Example 17 | Example 23 | Example 24 |
|---|---|---|---|
| Modulus |  |  |  |
| LD | 398,000 | 420,000 | 437,000 |
| TD | 442,000 | 473,000 | 488,000 |
| Free Shrink at 220° F.: |  |  |  |
| LD | 15 | 14 | 15 |
| TD | 19 | 19 | 22 |
| at 240° F.: |  |  |  |
| LD | 20 | 19 | 19 |
| TD | 26 | 26 | 28 |
| at 260° F.: |  |  |  |
| LD | 30 | 30 | 26 |
| TD | 38 | 36 | 38 |
| at 280° F.: |  |  |  |
| LD | 44 | 44 | 44 |
| TD | 51 | 51 | 52 |
| at 300° F.: |  |  |  |
| LD | 64 | 63 | 62 |
| TD | 68 | 67 | 68 |
| Haze |  |  |  |
| Unshrunk Clarity | 1.8 | 2.0 | 1.2 |
| Unshrunk Gloss | 82 | 81 | 81 |
|  | 86 | 83 | 89 |
| Film Thickness (mils) (related to MVTR data given below) |  |  |  |
| Unshrunk MVTR 2 | 0.89 | 0.91 | 0.82 |
| Unshrunk | 0.33 | 0.36 | 0.33 |
| Corrected for 75 gauge | 0.39 | 0.44 | 0.36 |
| Tear |  |  |  |
| LD | 1 | 7 | 4 |
| TD | 5 | 7 | 6 |
| Tensile |  |  |  |
| LD | 28,000 | 31,000 | 25,000 |
| TD | 29,000 | 33,000 | 29,000 |
| Elongation |  |  |  |
| LD | 80 | 86 | 84 |
| TD | 71 | 52 | 73 |

In a typical working example of making the film of the present invention:

An ethylene propylene copolymer (Fina 8473) containing about 4% by weight ethylene, was blended with the polypropylene in a blend ratio of about 92% by weight EPC and 8% by weight PP. (The PP percentage includes the additives discussed above).

The EPC/PP blend was then blended with a hydrocarbon resin (Regalrez 1128 from Hercules) in a blend ratio of about 90% by weight EPC/PP and 10% by weight HC.

A second blend was also prepared, in a blend ratio of about 84.5% by weight PP (Exxon PD 4062 E7), 15% by weight HC (Regalrez 1128), and 0.5% white mineral oil (Kaydol from Witco Chemical).

A circular coextrusion die was fed with three extruders to prepare a rive layer shrink film. One extruder was used to feed the blend of EPC or polypropylene, and HC, as a melt to the extrusion die to form the outer layers. Another extruder fed a polypropylene (Exxon PD 4062 E7) to the extrusion die to provide the intermediate layers in the multi-layer film. The third extruder provided, the second blend of PP and HC to the extrusion die.

The extruded tape was rapidly cooled to room temperature and collapsed by pinch rolls. The tape was subsequently heated to an orientation temperature. Using a bubble technique well known in the art, internal air pressure stretched the tape to about 4.5 times its unstretched dimensions in the longitudinal (machine) direction and about 4.0 times its unstretched dimensions in the transverse direction to form a bubble which provided biaxial orientation to the resulting film. The bubble was then rapidly cooled by chilled air in order to maintain the oriented state of the film. Finally, the bubble was collapsed and the expanded film gathered on a take-up roll. After orientation, the total wall thickness of the film was about one mil with 50% of the structure being the blend of ethylene propylene copolymer and polypropylene; 15% of the structure being the intermediate layers; and the remainder or 35% of the structure being the core layer.

It will be clear to one skilled in the art that the degree of stretching may be varied to obtain the desired degree of film gauge or thickness and to regulate the desired amount of shrink tension, free shrink, and other shrink properties of the final film, depending on the packaging application. Preferred stretching or racking ratios are between about 3.0 and 8.0 in both the machine and transverse directions.

The multi-layer film of the present invention is preferably not irradiated. However, the sealant material, if extrusion laminated, extrusion coated, or conventionally laminated to the substrate moisture barrier film, can itself be irradiated or electronically or chemically crosslinked prior to lamination. Irradiation may be accomplished by means well known in the art.

The blend ratios of the EPC and PP may be varied according to desired properties or end-use of the multi-layer film. For example, increasing the polypropylene in the blend will add stiffness to the film, but also increase the sealing temperature of the film. Conversely, increasing the EPC in the blend tends to lower the shrink temperature of the oriented film, or to increase shrink at the same temperature, and also lowers the sealing temperature of the film. A preferred blend includes between about 4% and 15% PP and between about 96% and 85% EPC.

The multilayer film of the present invention is preferably oriented either monoaxially or biaxially, and preferably used as a shrink film. Optionally, the oriented film may be further processed by reheating the film to a temperature near its orientation temperature, i.e. either somewhat below, at, or somewhat about its orientation temperature, to heat set the film. This future processing step has the advantage of substantially retaining many of the favorable physical characteristics of an oriented film, such as higher tensile strength, modulus and improved optical properties, while providing a substantial shrink-free film in applications where a shrink feature is undesirable.

The film of the present invention can utilize hydrocarbon resin in at least one or more, or even all the layers of the film, as long as the HC resin in any given layer is compatible from a process and performance point of view with the resin with which it is blended.

Films in accordance with this invention are preferably oriented, and preferably heat shrinkable. Preferred films exhibit a free shrink at 240° F. of at least 10% (LD) and 15% (TD), more preferably at least 15% (LD) and 22% (TD).

Obvious modifications to the invention as described may be made by one skilled in the art without departing from the spirit and scope of the claims as presented below.

What is claimed is:

1. A thermoplastic multi-layer film comprising:
   (a) a core layer comprising high density polyethylene;
   (b) two intermediate layers, on opposite surfaces of the core layer, comprising a polymeric material selected from the group consisting of:
      i) polymeric adhesive;
      ii) ethylene/vinyl acetate copolymer; and
      iii) ethylene/alpha olefin copolymer;
   (c) two moisture barrier layers, each disposed on a respective intermediate layer, wherein the moisture barrier layers comprise a blend of propylene polymer or copolymer, and a hydrocarbon resin comprising a thermoplastic resin of low molecular weight made from relatively impure monomers that are derived from coal-tar fractions or petroleum distillates; and
   (d) two outer layers, each disposed on a respective moisture barrier layer, wherein the outer layers comprise propylene polymer or copolymer, polybutene, or blends thereof.

2. The film of claim 1 wherein the film is an oriented, heat shrinkable film.

* * * * *